US012599890B2

(12) United States Patent
Zhang et al.

(10) Patent No.: US 12,599,890 B2
(45) Date of Patent: Apr. 14, 2026

(54) SOLID AMINE ADSORBENT OF CO2 AND METHOD FOR PREPARING SAME

(71) Applicant: DeCarbon Technology (Shenzhen) Co., Ltd, Shenzhen (CN)

(72) Inventors: Zuotai Zhang, Shenzhen (CN); Xuehua Shen, Shenzhen (CN); Feng Yan, Shenzhen (CN); Chunyan Li, Shenzhen (CN); Fan Qu, Shenzhen (CN)

(73) Assignee: DeCarbon Technology (Shenzhen) Co., Ltd., Shenzhen (CN)

( * ) Notice: Subject to any disclaimer, the term of this patent is extended or adjusted under 35 U.S.C. 154(b) by 1055 days.

(21) Appl. No.: 17/620,420

(22) PCT Filed: Jun. 9, 2021

(86) PCT No.: PCT/CN2021/099129
§ 371 (c)(1),
(2) Date: Dec. 17, 2021

(87) PCT Pub. No.: WO2022/257041
PCT Pub. Date: Dec. 15, 2022

(65) Prior Publication Data
US 2024/0033707 A1 Feb. 1, 2024

(51) Int. Cl.
*B01J 20/08* (2006.01)
*B01J 20/22* (2006.01)
(Continued)

(52) U.S. Cl.
CPC ............... *B01J 20/08* (2013.01); *B01J 20/22* (2013.01); *B01J 20/3021* (2013.01);
(Continued)

(58) Field of Classification Search
None
See application file for complete search history.

(56) References Cited

U.S. PATENT DOCUMENTS

| | | | |
|---|---|---|---|
| 10,065,174 B1 | 9/2018 | Wifong et al. | |
| 2011/0031179 A1 | 2/2011 | Chen et al. | |

(Continued)

FOREIGN PATENT DOCUMENTS

| | | | |
|---|---|---|---|
| CN | 1250746 A | | 4/2000 |
| CN | 1733606 A | * | 2/2006 |

(Continued)

OTHER PUBLICATIONS

Machine translation of Cai et al., CN103521187A (Cai) (Year: 2014).*

(Continued)

*Primary Examiner* — Keling Zhang

(74) *Attorney, Agent, or Firm* — Kagan Binder, PLLC

(57) ABSTRACT

A method for preparing a solid amine adsorbent of $CO_2$ includes introducing a gas mixture containing 10 vol. % to 50 vol. % of $CO_2$ is introduced into a sodium aluminate solution having a concentration in a range of 10 g/L to 100 g/L at room temperature to obtain a reaction solution. This occurs continuously until a pH value of the reaction solution is lowered to 9.5 to 9.8 to obtain a product solution containing a precipitate. The precipitate is filtered and washed. The filtered and washed precipitate is mixed with an organic alcohol at a mass ratio of 1:5 to 1:30 to obtain a suspension. The suspension is heated to an azeotropic point of water and the organic alcohol, and evaporated, boiled, and refluxed to obtain pore-enlarged pseudo boehmite. This is calcined to obtain aluminum oxide powder. The aluminum oxide powder is impregnated in an organic amine solution and dried.

8 Claims, 2 Drawing Sheets

(51) Int. Cl.

|  |  |
|---|---|
| *B01J 20/30* | (2006.01) |
| *B01J 20/32* | (2006.01) |

(52) U.S. Cl.

CPC ....... *B01J 20/3064* (2013.01); *B01J 20/3078* (2013.01); *B01J 20/3214* (2013.01); *B01J 20/3242* (2013.01)

(56) References Cited

U.S. PATENT DOCUMENTS

| | | | |
|---|---|---|---|
| 2018/0050322 A1 | 2/2018 | Kimura et al. |
| 2020/0197905 A1 | 6/2020 | Negami et al. |

FOREIGN PATENT DOCUMENTS

| | | | |
|---|---|---|---|
| CN | 103406092 A | 11/2013 |
| CN | 103521187 A | 1/2014 |
| CN | 103785349 A | 5/2014 |
| CN | 106890621 A | 6/2017 |
| CN | 109569517 A | 4/2019 |
| CN | 111298763 A | 6/2020 |

OTHER PUBLICATIONS

Machine translation of Liu et al., CN 106890621A (Liu) (Year: 2017).*

Cai et al., Influences of processing techniques of the $H_2O_2$-precipitated pseudoboehmite on the structural and textural properties of $\mu$-$Al_2O_3$, Colloids and Surfaces A: Physicochemi. Eng. Aspects, 2007 (Year: 2007).*

Sigma-Aldrich, Safety Data Sheet of Methanol, 2024, https://www.sigmaaldrich.com/US/en/sds/sial/322415?userType=anonymous (Year: 2024).*

Wang et al., Preparation of pseudoboehmite with a large pore volume and a large pore size by using a membrane-dispersion microstructured reactor through the reaction of $CO_2$ and a $NaAlO_2$ solution, Ind. Eng. Chem. Res., 2011 (Year: 2011).*

Machine translation of Cai et al., CN 1733606 A (Cai'2006). (Year: 2006).*

International Search Report for Application No. PCT/CN2021/099178, mailed Mar. 4, 2022, (4 pages).

Unpublished United States Utility U.S. Appl. No. 17/620,286, filed Dec. 17, 2021 (Not attached).

International Search Report for Counterpart Application No. PCT/CN2021/099129, mailed Mar. 4, 2022, (8 pages).

* cited by examiner

SOLID AMINE ADSORBENT OF CO2 AND METHOD FOR PREPARING SAME

CROSS-REFERENCE TO RELATED APPLICATION

This application is a National Stage application of International Application No. PCT/CN2021/099129 filed on Jun. 9, 2021 in the China National Intellectual Property Administration, the contents of which are hereby incorporated by reference.

TECHNICAL FIELD

The present disclosure relates to the field of adsorption and purification technology of $CO_2$ gas, in particular to a solid amine adsorbent of $CO_2$ and a method for preparing the same.

BACKGROUND

In response to the energy and environmental crises caused by global warming, achieving zero emission of greenhouse gases such as $CO_2$ is an important measure to control global warming to be less than 1.5° C. The development of $CO_2$ capture and storage (CCS) technology can avoid $CO_2$ emissions from industrial emission point sources and reduce the existing $CO_2$ in the atmosphere, which is an important part of achieving the goal of "carbon neutral". It is of great significance to deep decarbonization, large-scale production of low-carbon hydrogen energy, supply of low-carbon power, realization of negative emissions, and the like in particularly industries such as cement, steel, and chemical engineering. The core of CCS technology lies in the development of $CO_2$ capture materials. Efficient and cheap $CO_2$ capture materials are keys for reducing application cost of CCS technology.

Solid amine materials have the advantages of high $CO_2$ selectivity, low regeneration energy consumption, and wide application scenarios, making them the most promising $CO_2$ capture material at present. In order to achieve the purpose of reducing emissions, the captured $CO_2$ must be enriched into high-purity $CO_2$ for storage or utilization, so the solid amine adsorbent needs to be desorbed and regenerated under the realistic atmosphere of $CO_2$. However, at present, the solid amine materials mostly will produce serious urea chain compounds under realistic regeneration conditions, leading to severe chemical deactivation and a sharp decline of adsorption capacity. Therefore, preparation of solid amine materials with high $CO_2$ adsorption capacity, good anti-urea chains property, high cyclic stability, and low price is still a difficult problem to be solved urgently in this field.

SUMMARY

In view of above, it is necessary to provide a solid amine adsorbent of $CO_2$ having a high $CO_2$ adsorption capacity, good anti-urea chains property, and high cyclic stability.

A method for preparing a solid amine adsorbent of $CO_2$, including:
  providing pseudo boehmite;
  pore-enlarging the pseudo boehmite;
  calcining the pore-enlarged pseudo boehmite to obtain an aluminum oxide powder; and
  impregnating the aluminum oxide powder in an organic amine solution, and drying to obtain the solid amine adsorbent of $CO_2$.

In an embodiment, the pseudo boehmite is prepared by dropwise adding a $H_2O_2$ solution in a sodium aluminate solution, introducing $CO_2$ into the sodium aluminate solution, or mixing the sodium aluminate solution with an aluminum sulfate solution.

In an embodiment, the dropwise adding the $H_2O_2$ solution in the sodium aluminate solution to prepare the pseudo boehmite includes:
  dropwise adding a $H_2O_2$ solution having a mass fraction in a range of 5% to 20% to a sodium aluminate solution having a concentration in a range of 20 g/L to 200 g/L at room temperature to obtain a reaction solution, wherein a dropping time is 10 min to 60 min;
  standing the reaction solution for 30 min to obtain a product solution containing a precipitation; and
  filtering out the precipitation in the product solution, and washing the precipitation to obtain the pseudo boehmite;
  wherein a mole ratio of the sodium aluminate in the sodium aluminate solution to the $H_2O_2$ in the $H_2O_2$ solution is in a range of 1:1 to 1:5.

In an embodiment, the introducing $CO_2$ into the sodium aluminate solution to prepare the pseudo boehmite includes:
  introducing a gas mixture containing 10 vol. % to 50 vol. % of $CO_2$ into a sodium aluminate solution having a concentration in a range of 10 g/L to 100 g/L at room temperature to obtain a reaction solution;
  continuously introducing the gas mixture until a pH value of the reaction solution lowered to 9.5 to 9.8 to obtain a product solution containing a precipitation; and
  filtering out the precipitation in the product solution, and washing the precipitation to obtain the pseudo boehmite.

In an embodiment, the mixing the sodium aluminate solution with the aluminum sulfate solution to prepare the pseudo boehmite includes:
  mixing a sodium aluminate solution having a concentration in a range of 20 g/L to 200 g/L with an aluminum sulfate solution having a concentration in a range of 20 g/L to 200 g/L at a mass ratio of 1:1 to obtain a reaction solution;
  adjusting a pH of the reaction solution to 8.0 to 10.0, and stirring at a temperature between 25° C. and 80° C. for 2 hours to 5 hours to obtain a product solution containing a precipitation; and
  filtering out the precipitation in the product solution, and washing the precipitation to obtain the pseudo boehmite.

In an embodiment, the pore-enlarging the pseudo boehmite includes:
  mixing the filtered and washed precipitation with an organic alcohol at a mass ratio of 1:5 to 1:30 to obtain a suspension; and
  heating the suspension to an azeotropic point of water and the organic alcohol, evaporating for 10 min to 60 min, then heating the suspension to a boiling point of the organic alcohol and refluxing for 30 min to 90 min to obtain the pore-enlarged pseudo boehmite.

In an embodiment, the organic alcohol includes one or more selected from the group consisting of ethanol, n-propanol, isopropanol, n-butanol, isobutanol, and 2-butanol.

In an embodiment, the calcining the pore-enlarged pseudo boehmite to obtain the aluminum oxide powder includes: calcining the pore-enlarged pseudo boehmite at a temperature between 400° C. and 600° C. for 2 hours to 8 hours to obtain the aluminum oxide powder.

In an embodiment, after the step of calcining, further including a step of grinding the aluminum oxide powder to obtain a nanometer aluminum oxide powder.

In an embodiment, the organic amine solution includes an organic amine and a solvent, wherein the organic amine is one or more selected from the group consisting of polyethyleneimine, diethylenetriamine, tetraethylenepentamine, and pentaethylenehexamine, and the solvent is one or more selected from the group consisting of methanol, ethanol, acetone, and butyl acetate.

In an embodiment, a mass ratio of the organic amine to the solvent in the organic amine solution is in a range of 1:10 to 1:100.

In an embodiment, the impregnating the aluminum oxide powder in the organic amine solution, and drying to obtain the solid amine adsorbent of $CO_2$ includes:

dispersing the aluminum oxide powder in the organic amine solution to obtain a dispersion liquid; and removing a solvent in the dispersion liquid to obtain the solid amine adsorbent of $CO_2$.

In an embodiment, the removing the solvent in the dispersion liquid includes: evaporating the solvent at room temperature to obtain a residue, and drying the residue in a vacuum drying oven at a temperature between 60° C. and 80° C. for 3 hours to 6 hours.

The present disclosure further provides a solid amine adsorbent of $CO_2$, which is prepared by the method disclosed above.

The silicon-based solid amine adsorbent of $CO_2$ and the method for preparing the same disclosed in the present disclosure has following advantages.

(1) Macroporous nanometer aluminum oxide matrix has the advantages of wide source of raw material, simple preparation process, mild reaction conditions, easy control of operation, no need of complex equipment, and suitability for industrial production.

(2) A process for preparing the matrix does not need to add any surfactant, template agent or pore-enlarging agent. Organic solvents used in the azeotropic distillation process are common organic alcohols, which are cheap, recoverable and reusable, and has low environmental pollution and economic advantages.

(3) Solid amine adsorbent of $CO_2$ prepared from the macroporous nanometer aluminum oxide matrix can load a high content of organic amine, a saturated loading capacity of the solid amine adsorbent of $CO_2$ can be over 70%, and a $CO_2$ adsorption capacity of the solid amine adsorbent of $CO_2$ can be over 5 mmol/g.

(4) The prepared solid amine adsorbent of $CO_2$ has excellent cyclic stability. After 50 cycles in a realistic regeneration atmosphere of $CO_2$, the $CO_2$ adsorption capacity can still be maintained above 4.8 mmol/g with decay of less than 5%.

Since the high performance $CO_2$ adsorbent of the present disclosure has pretty high $CO_2$ adsorption capacity and excellent regeneration cyclic stability under actual conditions, the preparation process is simple, environmentally friendly and has a low price, and the high performance $CO_2$ adsorbent can be widely used in the field of $CO_2$ capture and marsh gas purification.

BRIEF DESCRIPTION OF THE DRAWINGS

In order to more clearly illustrate the specific embodiments of the present disclosure or the technical solutions in conventional art, the drawings used in the specific embodiments or the description of the prior art will be briefly described hereinafter. Obviously, the drawings in the following description are merely some embodiments of the application. For one of ordinary skill in the art, other drawings can be obtained based on these drawings without creative work.

DETAILED DESCRIPTION

Figure 1:
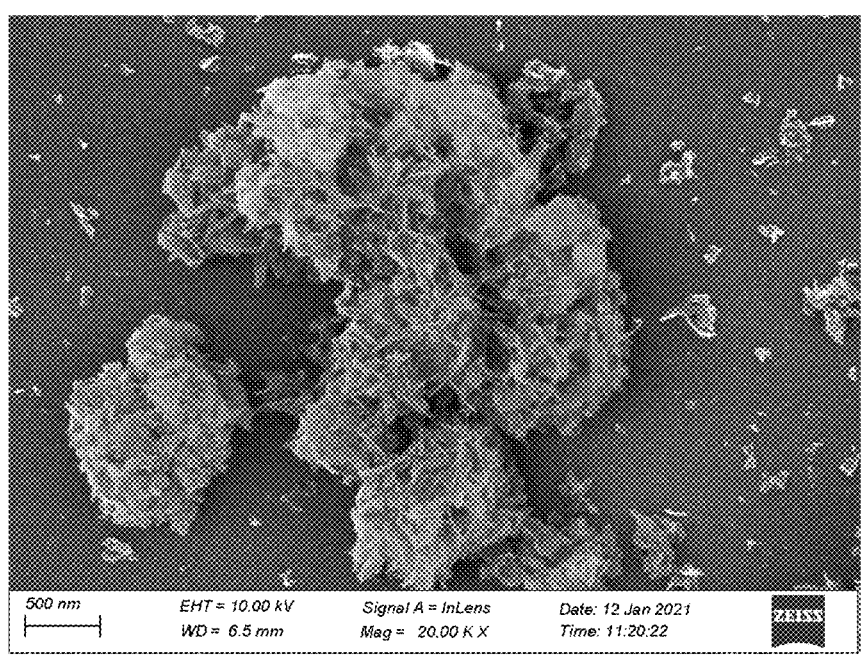
FIG. 1 is a scanning electron microscope (SEM) image of macroporous nanometer aluminum oxide synthesized in embodiment 1 of the present disclosure.

In order to make the purpose, technical solutions, and advantages of the present disclosure clearer, the present disclosure will be further illustrated in detail in conjunction to drawings of the present disclosure hereinafter. It should be understood that the specific embodiments described herein are only used to explain the present application, and are not used to limit the present application.

The present disclosure provides a method for preparing a solid amine adsorbent of $CO_2$, including:

S1, providing pseudo boehmite;

S2, pore-enlarging the pseudo boehmite;

S3, calcining the pore-enlarged pseudo boehmite to obtain aluminum oxide powder; and S4, impregnating the aluminum oxide powder in an organic amine solution, and drying to obtain the solid amine adsorbent of $CO_2$.

In the present disclosure, after the pseudo boehmite is pore-enlarged and calcined, aluminum oxide powder with relatively large pore volume can be obtained. The aluminum oxide powder with relatively large pore volume can load high content of organic amine, so as to improve $CO_2$ adsorption capacity of the solid amine adsorbent of $CO_2$. In addition, when the solid amine material in conventional art is regenerated by $CO_2$ sweep gas, $CO_2$ and primary amine functional groups in active amine can be easily converted to urea chain compounds at high temperature (over 130° C.), so that $CO_2$ cannot be desorbed from the adsorbent, leading to deactivation of solid amine adsorbent. Since the nanometer aluminum oxide prepared in the present disclosure has abundant Lewis acid sites, the nanometer aluminum oxide can undergo cross-linking reactions with the active amine to convert the primary amine functional groups in the active amine to secondary amine functional groups, thereby avoiding formation of urea chain compounds. The solid amine adsorbent of $CO_2$ in the present disclosure has anti-urea chains property and high cyclic stability, and can maintain high $CO_2$ adsorption capacity after a plurality of $CO_2$ adsorption-regeneration cycles.

In step S1, the pseudo boehmite can be prepared by a plurality of methods.

In some embodiments, the pseudo boehmite is prepared by dropwise adding $H_2O_2$ solution into a sodium aluminate solution.

The sodium aluminate solution can react with the $H_2O_2$ solution at room temperature to produce a pseudo boehmite precipitation. In this embodiment, properties such as morphology, specific surface area, pore volume and the like of the pseudo boehmite and the aluminum oxide powder prepared subsequently can be controlled by controlling reaction conditions such as a concentration of the sodium aluminate solution, a concentration of the $H_2O_2$ solution, a ratio of the sodium aluminate solution to the $H_2O_2$ solution, a dropping speed of the $H_2O_2$ solution, reaction time and the like.

In order to obtain pseudo boehmite and aluminum oxide powder having high specific surface area and large pore volume, the concentration of the sodium aluminate solution can be in a range of 20 g/L to 200 g/L, for example 50 g/L to 190 g/L, 50 g/L to 180 g/L, 70 g/L to 170 g/L, and for example 80 g/L, 90 g/L, 100 g/L, 110 g/L, 120 g/L, 130 g/L, 140 g/L, 150 g/L, 160 g/L. The concentration of the $H_2O_2$ solution can be in a range of 5 wt % to 20 wt %, for example 6 wt % to 18 wt %, 7 wt % to 16 wt %, 8 wt % to 14 wt %, and for example 9 wt %, 10 wt %, 11 wt %, 12 wt %, and 13 wt %. In the reaction solution after completion of the dropwise addition, a mole ratio of sodium aluminate to $H_2O_2$ in the sodium aluminate solution and the $H_2O_2$ solution can be in a range of 1:1 to 1:5, for example 1:2, 1:3, and 1:4. The dropping time can be 10 min to 60 min. After the dropwise addition is completed, the reaction solution can be allowed to stand for 10 min to 60 min, so as to obtain a product solution containing the pseudo boehmite precipitation. The product solution can be filtered and washed to obtain a pseudo boehmite filter cake. Both the sodium aluminate solution and the $H_2O_2$ solution can be aqueous solutions.

In another embodiment, the pseudo boehmite is prepared by introducing $CO_2$ into a sodium aluminate solution.

A gas containing $CO_2$ can be introduced into the sodium aluminate solution at room temperature to react and produce a pseudo boehmite precipitation. In this embodiment, properties such as morphology, specific surface area, pore volume and the like of the pseudo boehmite and the aluminum oxide powder prepared subsequently can be controlled by controlling reaction conditions such as a concentration of the sodium aluminate solution, a concentration of $CO_2$ in the gas, a flow rate of the gas containing $CO_2$, pH of the reaction solution and the like.

In order to obtain pseudo boehmite and aluminum oxide powder having high specific surface area and large pore volume, the concentration of the sodium aluminate solution can be in a range of 10 g/L to 100 g/L, for example 10 g/L to 90 g/L, 10 g/L to 80 g/L, 15 g/L to 65 g/L, and for example 10 g/L, 20 g/L, 25 g/L, 30 g/L, 50 g/L, 70 g/L, 90 g/L, and 100 g/L. A concentration of $CO_2$ in the gas containing $CO_2$ can be in a range of 10 vol. % to 50 vol. %, for example 10 vol. % to 40 vol. %, 10 vol. % to 30 vol. %, and for example 15 vol. %, 20 vol. %, and 25 vol. %. The flow rate of the gas containing $CO_2$ can be 600 mL/min to 1000 mL/min of $CO_2$ per liter of the sodium aluminate solution, for example 700 mL/min, 800 mL/min, and 900 mL/min. The pH of the final product solution can be in a range of 9.5 to 9.8, for example 9.5, 9.6, 9.7, and 9.8. After the reaction is completed, the product solution can be filtered and washed to obtain a pseudo boehmite filter cake. The sodium aluminate solution can be an aqueous solution. The gas containing $CO_2$ does not contain other gases that can react with the sodium aluminate solution.

In yet another embodiments, the pseudo boehmite is prepared by mixing a sodium aluminate solution with an aluminum sulfate solution.

The sodium aluminate solution can react with the aluminum sulfate solution to produce a pseudo boehmite precipitation. In this embodiment, properties such as morphology, specific surface area, pore volume and the like of the pseudo boehmite and the aluminum oxide powder prepared subsequently can be controlled by controlling reaction conditions such as a concentration of the sodium aluminate solution, a concentration of the aluminum sulfate solution, a ratio of the sodium aluminate solution to the aluminum sulfate solution, a reaction temperature, pH, reaction time and the like.

In order to obtain pseudo boehmite and aluminum oxide powder having high specific surface area and large pore volume, the concentration of the sodium aluminate solution can be in a range of 20 g/L to 200 g/L, for example 20 g/L to 150 g/L, 20 g/L to 120 g/L, 20 g/L to 80 g/L, and for example 20 g/L, 30 g/L, 40 g/L, 50 g/L, 60 g/L, 70 g/L, and 80 g/L. The concentration of the aluminum sulfate can be in a range of 20 g/L to 200 g/L, for example 20 g/L to 150 g/L, 20 g/L to 100 g/L, 20 g/L to 50 g/L, and for example 20 g/L, 25 g/L, 30 g/L, 35 g/L, 40 g/L, 45 g/L, and 50 g/L. A mass ratio of the sodium aluminate solution to the aluminum sulfate solution can be in a range of 1:3 to 3:1, for example 1:2 to 2:1, for example 1:2, 1:1, and 2:1. The sodium aluminate solution can react with the aluminum sulfate solution under condition of stirring. The reaction temperature of the sodium aluminate solution and the aluminum sulfate solution can be in a range of 25° C. to 90° C., for example 60° C., 70° C., and 80° C. The pH of the mixed solution of the sodium aluminate solution and the aluminum sulfate solution can be adjusted to 8.0 to 10.0, for example 8.0, 8.5, 9.0, 9.5, and 10.0, and then heated for reaction. The reaction time of the sodium aluminate solution and the aluminum sulfate solution can be 2 hours to 5 hours. Both the sodium aluminate solution and the aluminum sulfate solution can be aqueous solutions. After the reaction is completed, the product solution can be filtered and washed to obtain a pseudo boehmite filter cake.

It should be understood that the pseudo boehmite can be prepared by other methods.

In step S2, a method for pore-enlarging the pseudo boehmite can include azeotropically pore-enlarging the pseudo boehmite filter cake and an organic alcohol.

In an embodiment, the method for pore-enlarging the pseudo boehmite specifically includes:

S21, uniformly mixing the pseudo boehmite filter cake and the organic alcohol to obtain a suspension; and S22, heating the suspension to an azeotropic point of water and the organic alcohol, evaporating for 10 min to 60 min, then heating the suspension to a boiling point of the organic alcohol and refluxing for 30 min to 90 min to obtain the pore-enlarged pseudo boehmite.

In step S21, the organic alcohol includes, but is not limited to, one or more selected from the group consisting of ethanol, n-propanol, isopropanol, n-butanol, isobutanol, and 2-butanol. A mass ratio of the pseudo boehmite filter cake to the organic alcohol may be in a range of 1:5 to 1:30, for example 1:5 to 1:20, 1:5 to 1:15.

In step S3, properties such as morphology, specific surface area, pore volume and the like of the aluminum oxide powder can be controlled by controlling calcination conditions.

In order to obtain aluminum oxide powder having high specific surface area and large pore volume, the calcination temperature can be in a range of 400° C. to 600° C., the calcination time can be in a range of 4 hours to 8 hours, and the heating rate can be in a range of 2° C./min to 30° C./min.

Furthermore, after step S3, the method can further include a step of grinding the aluminum oxide powder to further reduce a particle size of the aluminum oxide powder. In an embodiment, the aluminum oxide can be ground to have the particle size less than 200 meshes.

In step S4, the organic amine solution includes an organic amine and a solvent. The organic amine includes but is not limited to one or more selected from the group consisting of polyethyleneimine, diethylenetriamine, tetraethylenepentamine, and pentaethylenehexamine. The solvent can dissolve the organic amine and can be volatile. The solvent includes but is not limited to one or more selected from the group consisting of methanol, ethanol, acetone, and butyl acetate.

The loading capacity of organic amine on the aluminum oxide powder and uniformity of the organic amine on the aluminum oxide powder can be controlled by controlling the concentration of the organic amine solution. In an embodiment, in order to obtain the solid amine adsorbent of $CO_2$ with a high and uniform loading of organic amines, a mass ratio of the organic amine to the solvent in the organic amine solution can be in a range of 1:10 to 1:100, for example 1:10 to 1:80, 1:10 to 1:60, 1:10 to 1:40.

In an embodiment, step S4 can include:

S41, dispersing the aluminum oxide powder in the organic amine solution to obtain a dispersion liquid; and S42, removing a solvent in the dispersion liquid to obtain the solid amine adsorbent of $CO_2$.

The step of removing the solvent in the dispersion liquid can include: evaporating the solvent at room temperature to obtain a residue, and drying the residue in a vacuum drying oven at a temperature between 60° C. and 80° C. for 3 hours to 6 hours.

In some embodiments, loading capacity of the organic amine of the solid amine adsorbent of $CO_2$ can be in a range of 10% to 80%.

After obtaining the solid amine adsorbent of $CO_2$, $CO_2$ adsorption capacity and adsorption-desorption cyclic performance of the silicon-based solid amine adsorbent of $CO_2$ can be tested. In an embodiment, the steps for testing the $CO_2$ adsorption capacity can include: adsorbing for 5 min to 60 min by the solid amine adsorbent of $CO_2$ under conditions of 30° C. to 110° C., 4 vol. % to 100 vol. % of $CO_2$, and 0 vol. % to 20 vol. % of vapor, so as to test the $CO_2$ adsorption capacity. In an embodiment, a regeneration process of the adsorbent is heating for 5 min to 30 min under conditions of 120° C. to 165° C., $CO_2$ airflow, and 0 vol. % to 40 vol. % of vapor.

Embodiment 1

(1) 13.0 g of sodium aluminate was dissolved in a beaker containing 80 mL of deionized water, and the beaker was placed in a stirrer for continuous stirring. 150 mL of $H_2O_2$ solution having a mass fraction of 12% was dropwise added into the beaker at room temperature. The dropping speed was controlled so that the dropping time was 30 min. After the reaction was completed, the reaction solution was allowed to stand for 30 min, and then washed and filtered to obtain an undried filter cake.

(2) The filter cake and butanol were mixed at a mass ratio of 1:10, and mashed to obtain a suspension. The suspension was placed in a rotary evaporator, heated to 93° C. to evaporate for 30 min, then heated to 117° C. to reflux for 60 min, and then stopped heating. An azeotropic product was cooled, and then separated to obtain a precipitation. The precipitation was dried in a drying oven at 80° C. for 12 hours to obtain pore-enlarged pseudo boehmite.

(3) The pore-enlarged pseudo boehmite was placed in a muffle furnace, calcined at 500° C. for 5 hours, taken out, cooled, and ground to powders having a granularity of less than 200 meshes, to obtain a macroporous nanometer aluminum oxide powder. The macroporous nanometer aluminum oxide powder was tested by $N_2$ adsorption-desorption method, and the BET specific surface area was 397.9 m²/g, the pore volume was 2.60 cm³/g, and the average pore diameter was 22.5 nm.

(4) 3.1 g of polyethyleneimine was added into 30 mL of methanol solution, and stirred for dissolving to uniformly disperse the polyethyleneimine. 1 g of the prepared macroporous nanometer aluminum oxide matrix was added, stirred and evaporated at 25° C. for 5 hours, and then placed in a vacuum drying oven at 60° C. for 5 hours to obtain the solid amine adsorbent of $CO_2$.

(5) 20 mg of the adsorbent was placed in a crucible in a thermal analyzer. The adsorbent was firstly degassed in a pure Ar atmosphere at 120° C. for 30 min, and then was cooled to 90° C. A mixed gas containing 95 vol. % of $CO_2$ and 5% of vapor and with a flow rate of 50 mL/min was introduced to carry out an adsorption experiment for 30 min. Afterwards, a mixed gas containing 70 vol. % of $CO_2$ and 30% of vapor was introduced, and the adsorbent was regenerated at 135° C. for 10 min. Then the reaction system was cooled to 90° C. to carry out a new adsorption-regeneration process, and the adsorption-regeneration process was repeated for 50 times.

Embodiment 2

(1) 13.0 g of sodium aluminate was dissolved in a beaker containing 80 mL of deionized water, and the beaker was placed in a stirrer for continuous stirring. 150 mL of $H_2O_2$ solution having a mass fraction of 12% was dropwise added into the beaker at room temperature. The dropping speed was controlled so that the dropping time was 30 min. After the reaction was completed, the reaction solution was allowed to stand for 30 min, and then washed and filtered to obtain an undried filter cake.

(2) The filter cake and butanol were mixed at a mass ratio of 1:10, and mashed to obtain a suspension. The suspension was placed in a rotary evaporator, heated to 93° C. to evaporate for 30 min, then heated to 117° C. to reflux for 60 min, and then stopped heating. An azeotropic product was cooled, and then separated to obtain a precipitation. The precipitation was dried in a drying oven at 80° C. for 12 hours to obtain pore-enlarged pseudo boehmite.

(3) The pore-enlarged pseudo boehmite was placed in a muffle furnace, calcined at 500° C. for 5 hours, taken out, cooled, and ground to powders having a granularity of less than 200 meshes, to obtain a macroporous nanometer aluminum oxide powder. The macroporous nanometer aluminum oxide powder was tested by $N_2$ adsorption-desorption method, and the BET specific surface area was 397.9 m²/g, the pore volume was 2.60 cm³/g, and the average pore diameter was 22.5 nm.

(4) 2.0 g of polyethyleneimine was added into 30 mL of methanol solution, and stirred for dissolving to uniformly disperse the polyethyleneimine. 1 g of the prepared macroporous nanometer aluminum oxide matrix was added, stirred and evaporated at 25° C. for 5 hours, and then placed in a vacuum drying oven at 60° C. for 5 hours to obtain the solid amine adsorbent of $CO_2$.

(5) 20 mg of the adsorbent was placed in a crucible in a thermal analyzer. The adsorbent was firstly degassed in a pure Ar atmosphere at 120° C. for 30 min, and then was cooled to 90° C. A mixed gas containing 40 vol. % of $CO_2$, 5% of vapor, and 55 vol. % of $CH_4$ and with a flow rate of 50 mL/min was introduced to carry out an adsorption experiment for 30 min. Afterwards, a mixed gas containing 70 vol. % of $CO_2$ and 30% of vapor was introduced, and the adsorbent was regenerated at 135° C. for 10 min. Then the reaction system was cooled to 90° C. to carry out a new adsorption-regeneration process, and the adsorption-regeneration process was repeated for 50 times.

Embodiment 3

(1) A sodium aluminate solution having a mass concentration of 2% was placed in a reaction still, and $CO_2$ having a concentration of 15 vol. % and a flow rate of 800 mL/min per liter of the solution was introduced into the reaction still, and completely reacted at 25° C. for 3.5 hours. After the pH was reduced to below 9.8, the reaction solution was washed and filtered to obtain an undried filter cake.

(2) The filter cake and butanol were mixed at a mass ratio of 1:10, and mashed to obtain a suspension. The suspension was placed in a rotary evaporator, heated to 93° C. to evaporate for 30 min, then heated to 117° C. to reflux for 60 min, and then stopped heating. An azeotropic product was cooled, and then separated to obtain a precipitation. The precipitation was dried in a drying oven at 80° C. for 12 hours to obtain pore-enlarged pseudo boehmite.

(3) The pore-enlarged pseudo boehmite was placed in a muffle furnace, calcined at 500° C. for 5 hours, taken out, cooled, and ground to powders having a granularity of less than 200 meshes, to obtain a macroporous nanometer aluminum oxide powder. The macroporous nanometer aluminum oxide powder was tested by $N_2$ adsorption-desorption method, and the BET specific surface area was 359.3 $m^2/g$, the pore volume was 1.62 $cm^3/g$, and the average pore diameter was 14.6 nm.

(4) 2.0 g of polyethyleneimine was added into 30 mL of methanol solution, and stirred for dissolving to uniformly disperse the polyethyleneimine. 1 g of the prepared macroporous nanometer aluminum oxide matrix was added, stirred and evaporated at 25° C. for 5 hours, and then placed in a vacuum drying oven at 60° C. for 5 hours to obtain the solid amine adsorbent of $CO_2$.

(5) 20 mg of the adsorbent was placed in a crucible in a thermal analyzer. The adsorbent was firstly degassed in a pure Ar atmosphere at 120° C. for 30 min, and then was cooled to 90° C. A mixed gas containing 40 vol. % of $CO_2$, 5% of vapor, and 55 vol. % of $CH_4$ and with a flow rate of 50 mL/min was introduced to carry out an adsorption experiment for 30 min. Afterwards, a mixed gas containing 95 vol. % of $CO_2$ and 5% of vapor was introduced, and the adsorbent was regenerated at 165° C. for 10 min. Then the reaction system was cooled to 90° C. to carry out a new adsorption-regeneration process, and the adsorption-regeneration process was repeated for 50 times.

Embodiment 4

(1) A sodium aluminate solution having a mass concentration of 2% was placed in a reaction still, and $CO_2$ having a concentration of 15 vol. % and a flow rate of 800 mL/min per liter of the solution was introduced into the reaction still, and completely reacted at 25° C.

for 3.5 hours. After the pH was reduced to below 9.8, the reaction solution was washed and filtered to obtain an undried filter cake.

(2) The filter cake and butanol were mixed at a mass ratio of 1:10, and mashed to obtain a suspension. The suspension was placed in a rotary evaporator, heated to 93° C. to evaporate for 30 min, then heated to 117° C. to reflux for 60 min, and then stopped heating. An azeotropic product was cooled, and then separated to obtain a precipitation. The precipitation was dried in a drying oven at 80° C. for 12 hours to obtain pore-enlarged pseudo boehmite.

(3) The pore-enlarged pseudo boehmite was placed in a muffle furnace, calcined at 600° C. for 5 hours, taken out, cooled, and ground to powders having a granularity of less than 200 meshes, to obtain a macroporous nanometer aluminum oxide powder. The macroporous nanometer aluminum oxide powder was tested by $N_2$ adsorption-desorption method, and the BET specific surface area was 300.6 $m^2/g$, the pore volume was 1.54 $cm^3/g$, and the average pore diameter was 16.7 nm.

(4) 2.0 g of polyethyleneimine was added into 30 mL of methanol solution, and stirred for dissolving to uniformly disperse the polyethyleneimine. 1 g of the prepared macroporous nanometer aluminum oxide matrix was added, stirred and evaporated at 25° C. for 5 hours, and then placed in a vacuum drying oven at 60° C. for 5 hours to obtain the solid amine adsorbent of $CO_2$.

(5) 20 mg of the adsorbent was placed in a crucible in a thermal analyzer. The adsorbent was firstly degassed in a pure Ar atmosphere at 120° C. for 30 min, and then was cooled to 90° C. A mixed gas containing 4 vol. % of $CO_2$, 20% of vapor, and 76 vol. % of $N_2$ and with a flow rate of 50 mL/min was introduced to carry out an adsorption experiment for 30 min. Afterwards, 100 vol. % of $CO_2$ gas was introduced, and the adsorbent was regenerated at 165° C. for 10 min. Then the reaction system was cooled to 90° C. to carry out a new adsorption-regeneration process, and the adsorption-regeneration process was repeated for 50 times.

Embodiment 5

(1) A sodium aluminate solution having a mass concentration of 2% was placed in a reaction still, and $CO_2$ having a concentration of 15 vol. % and a flow rate of 800 mL/min per liter of the solution was introduced into the reaction still, and completely reacted at 25° C. for 3.5 hours. After the pH was reduced to below 9.8, the reaction solution was washed and filtered to obtain an undried filter cake.

(2) The filter cake and ethanol were mixed at a mass ratio of 1:10, and mashed to obtain a suspension. The suspension was placed in a rotary evaporator, heated to 78.37° C. to evaporate for 30 min, then heated to 78.4° C. to reflux for 60 min, and then stopped heating. An azeotropic product was cooled, and then separated to obtain a precipitation. The precipitation was dried in a drying oven at 80° C. for 12 hours to obtain pore-enlarged pseudo boehmite.

(3) The pore-enlarged pseudo boehmite was placed in a muffle furnace, calcined at 500° C. for 5 hours, taken out, cooled, and ground to powders having a granularity of less than 200 meshes, to obtain a macroporous nanometer aluminum oxide powder. The macroporous nanometer aluminum oxide powder was tested by $N_2$ adsorption-desorption method, and the BET specific surface area was 361.3 m$^2$/g, the pore volume was 1.49 cm$^3$/g, and the average pore diameter was 12.7 nm.

(4) 2.0 g of polyethyleneimine was added into 30 mL of methanol solution, and stirred for dissolving to uniformly disperse the polyethyleneimine. 1 g of the prepared macroporous nanometer aluminum oxide matrix was added, stirred and evaporated at 25° C. for 5 hours, and then placed in a vacuum drying oven at 60° C. for 5 hours to obtain the solid amine adsorbent of CO$_2$.

(5) 20 mg of the adsorbent was placed in a crucible in a thermal analyzer. The adsorbent was firstly degassed in a pure Ar atmosphere at 120° C. for 30 min, and then was cooled to 90° C. A mixed gas containing 40 vol. % of CO$_2$, 5% of vapor, and 55 vol. % of CH$_4$ and with a flow rate of 50 mL/min was introduced to carry out an adsorption experiment for 30 min. Afterwards, 100 vol. % of CO$_2$ gas was introduced, and the adsorbent was regenerated at 120° C. for 10 min. Then the reaction system was cooled to 90° C. to carry out a new adsorption-regeneration process, and the adsorption-regeneration process was repeated for 50 times.

Embodiment 6

(1) At a temperature of 25° C., 100 mL of sodium aluminate solution having a concentration of 50 g/L and 100 mL of aluminum sulfate solution having a concentration of 35 g/L were placed in two beakers, respectively. The two solutions were quickly mixed while stirring, and ammonium hydroxide and sulfate acid were dropwise added to adjust the pH to 8.5, and then was aged at 80° C. for 3 hours while stirring. The reaction solution was washed and filtered to obtain an undried filter cake.

nanometer aluminum oxide powder. The macroporous nanometer aluminum oxide powder was tested by N$_2$ adsorption-desorption method, and the BET specific surface area was 343.5 m$^2$/g, the pore volume was 2.13 cm$^3$/g, and the average pore diameter was 23.8 nm.

(4) 2.0 g of polyethyleneimine was added into 30 mL of methanol solution, and stirred for dissolving to uniformly disperse the polyethyleneimine. 1 g of the prepared macroporous nanometer aluminum oxide matrix was added, stirred and evaporated at 25° C. for 5 hours, and then placed in a vacuum drying oven at 60° C. for 5 hours to obtain the solid amine adsorbent of CO$_2$.

(5) 20 mg of the adsorbent was placed in a crucible in a thermal analyzer. The adsorbent was firstly degassed in a pure Ar atmosphere at 120° C. for 30 min, and then was cooled to 90° C. A mixed gas containing 40 vol. % of CO$_2$, 5% of vapor, and 55 vol. % of CH$_4$ and with a flow rate of 50 mL/min was introduced to carry out an adsorption experiment for 30 min. Afterwards, a mixed gas containing 70 vol. % of CO$_2$ and 30% of vapor was introduced, and the adsorbent was regenerated at 135° C. for 10 min. Then the reaction system was cooled to 90° C. to carry out a new adsorption-regeneration process, and the adsorption-regeneration process was repeated for 50 times.

Figure 2:
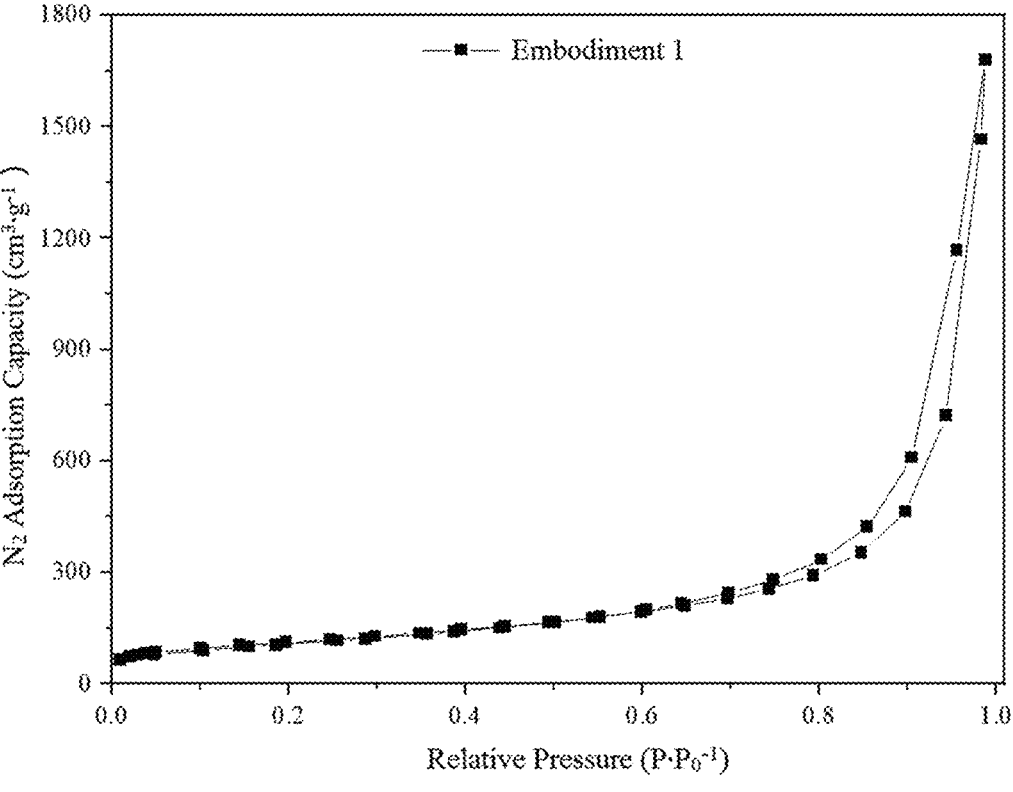
FIG. 2 is an $N_2$ adsorption curve of macroporous nanometer aluminum oxide synthesized in embodiment 1 of the present disclosure.
Figure 3:
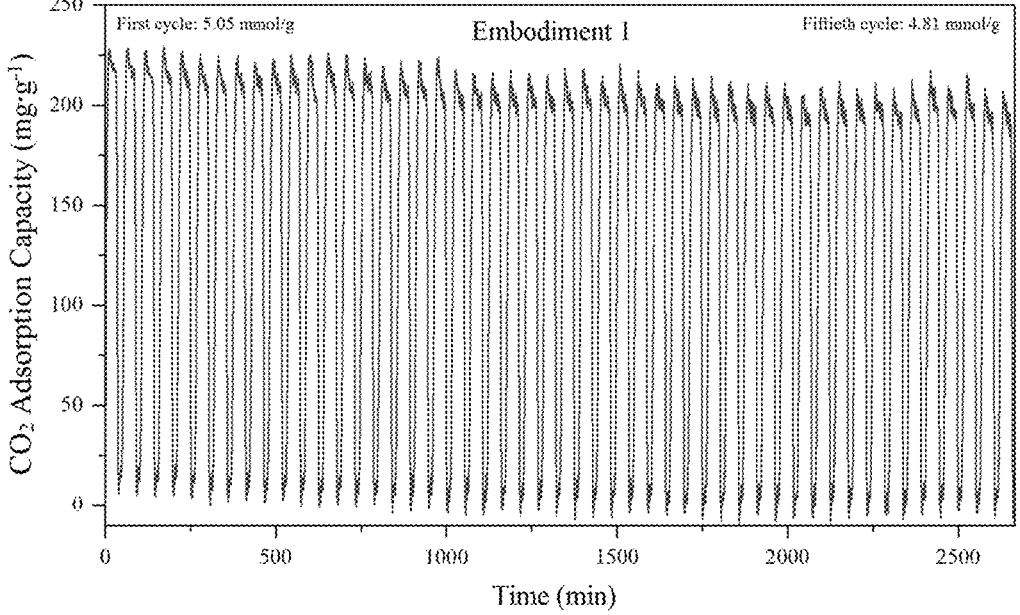
FIG. 3 is a graph of long term cyclic stability of solid amine adsorbent of $CO_2$ in embodiment 1 of the present disclosure.

In the above embodiments, CO$_2$ adsorption capacities and cyclic stabilities of the prepared high performance solid amine adsorbents of CO$_2$ are shown in Table 1 and FIG. 2 and FIG. 3. The experiment results show that saturated CO$_2$ adsorption capacity of the solid amine adsorbent can be over 5 mmol/g. The solid amine adsorbent has excellent cyclic performance under realistic regeneration atmosphere of CO$_2$, and the adsorption capacity can be maintained above 4.8 mmol/g after 50 cycles with decay of less than 5%.

TABLE 1

Comparison of CO$_2$ adsorption capacities of adsorbents in embodiments 1 to 6

| | Structural properties of macroporous nanometer aluminum oxide | | | CO$^2$ adsorption capacity of high performance solid amine adsorbent | | | |
| Embodiment | Specific Surface area (m$^2$/g) | Pore volume (cm$^3$/g) | Average pore diameter (nm) | Organic amine content (wt. %) | Adsorption capacity of the first cycle (mmol/g) | Adsorption capacity of the fiftieth cycle (mmol/g) | Decay rate (%) |
|---|---|---|---|---|---|---|---|
| 1 | 397.9 | 2.60 | 22.5 | 65 | 5.05 | 4.81 | 4.75 |
| 2 | 397.9 | 2.60 | 22.5 | 60 | 4.68 | 4.42 | 5.55 |
| 3 | 359.3 | 1.62 | 14.6 | 60 | 4.09 | 3.28 | 19.80 |
| 4 | 300.6 | 1.54 | 16.7 | 60 | 3.71 | 3.09 | 16.71 |
| 5 | 361.3 | 1.49 | 12.7 | 60 | 1.91 | 1.87 | 2.09 |
| 6 | 343.5 | 2.13 | 23.8 | 60 | 4.64 | 4.41 | 4.97 |

(2) The filter cake and butanol were mixed at a mass ratio of 1:10, and mashed to obtain a suspension. The suspension was placed in a rotary evaporator, heated to 93° C. to evaporate for 30 min, then heated to 117° C. to reflux for 60 min, and then stopped heating. An azeotropic product was cooled, and then separated to obtain a precipitation. The precipitation was dried in a drying oven at 80° C. for 12 hours to obtain pore-enlarged pseudo boehmite.

(3) The pore-enlarged pseudo boehmite was placed in a muffle furnace, calcined at 500° C. for 5 hours, taken out, cooled, and ground to powders having a granularity of less than 200 meshes, to obtain a macroporous The present disclosure further provides a solid amine adsorbent of CO$_2$, which can be prepared by the method disclosed above.

The silicon-based solid amine adsorbent of CO$_2$ and the method for preparing the same disclosed in the present disclosure has following advantages.

(1) Macroporous nanometer aluminum oxide matrix has the advantages of wide source of raw material, simple preparation process, mild reaction conditions, easy control of operation, no need of complex equipment, and suitability for industrial production.

(2) A process for preparing the matrix does not need to add any surfactant, template agent or pore-enlarging agent. Organic solvents used in the azeotropic distillation process are common organic alcohols, which are cheap, recoverable and reusable, and has low environmental pollution and economic advantages.

(3) Solid amine adsorbent of $CO_2$ prepared from the macroporous nanometer aluminum oxide matrix can load a high content of organic amine, a saturated loading capacity of the solid amine adsorbent of $CO_2$ can be over 70%, and a $CO_2$ adsorption capacity of the solid amine adsorbent of $CO_2$ can be over 5 mmol/g.

(4) The prepared solid amine adsorbent of $CO_2$ has excellent cyclic stability. After 50 cycles in a realistic regeneration atmosphere of $CO_2$, the $CO_2$ adsorption capacity can still be maintained above 4.8 mmol/g with decay of less than 5%.

Since the high performance $CO_2$ adsorbent of the present disclosure has pretty high $CO_2$ adsorption capacity and excellent regeneration cyclic stability under actual conditions, the preparation process is simple, environmentally friendly and has a low price, and the high performance $CO_2$ adsorbent can be widely used in the field of $CO_2$ capture and marsh gas purification.

The technical features of the above-mentioned embodiments can be combined arbitrarily. In order to make the description concise, not all possible combinations of the various technical features in the foregoing embodiments are described. However, as long as there is no contradiction in the combination of these technical features, it should be regarded as the scope described in this specification.

The above embodiments only express several implementation modes of the present application, and their descriptions are relatively specific and detailed, but they should not be understood as limiting the scope of the patent application. It should be noted that for those of ordinary skill in the art, without departing from the concept of this application, several modifications and improvements can be made, and these all fall within the protection scope of this application. Therefore, the scope of protection of the patent in this application shall be subject to the appended claims.

What is claimed is:

1. A method for preparing a solid amine adsorbent of $CO_2$, comprising, continuously introducing a gas mixture containing 10 vol. % to 20 vol. % of $CO_2$ into a reactor still containing a sodium aluminate solution having a concentration in a range of 10 g/L to 100 g/L at room temperature to obtain a reaction solution, until a pH value of the reaction solution is lowered to 9.5 to 9.8 to obtain a product solution containing a precipitate, with a flow rate of the gas mixture being 600 mL/min to 1000 mL/min of $CO_2$ per liter of the sodium aluminate solution;

filtering out the precipitate in the product solution, and washing the precipitate;

mixing the filtered and washed precipitate with an organic alcohol at a mass ratio of 1:5 to 1:30 to obtain a suspension;

heating the suspension to an azeotropic point of water and the organic alcohol, evaporating for 10 min to 60 min, then heating the suspension to a boiling point of the organic alcohol and refluxing for 30 min to 90 min to obtain a pore-enlarged pseudo boehmite;

calcining the pore-enlarged pseudo boehmite to obtain an aluminum oxide powder; and impregnating the aluminum oxide powder in an organic amine solution, and drying to obtain the solid amine adsorbent of $CO_2$.

2. The method according to claim 1, wherein the organic alcohol comprises one or more selected from the group consisting of ethanol, n-propanol, isopropanol, n-butanol, isobutanol, and 2-butanol.

3. The method according to claim 1, wherein the calcining the pore-enlarged pseudo boehmite to obtain the aluminum oxide powder comprises:

calcining the pore-enlarged pseudo boehmite at a temperature between 400° C. and 600° C. for 2 hours to 8 hours to obtain the aluminum oxide powder.

4. The method according to claim 1, wherein after the step of calcining, further comprising a step of grinding the aluminum oxide powder to obtain a nanometer aluminum oxide powder.

5. The method according to claim 4, wherein the impregnating the aluminum oxide powder in the organic amine solution, and drying to obtain the solid amine adsorbent of $CO_2$ comprises:

dispersing the nanometer aluminum oxide powder in the organic amine solution to obtain a dispersion liquid; and removing a solvent in the dispersion liquid to obtain the solid amine adsorbent of $CO_2$.

6. The method according to claim 5, wherein the removing the solvent in the dispersion liquid comprises: evaporating the solvent at room temperature to obtain a residue, and drying the residue in a vacuum drying oven at a temperature between 60° C. and 80° C. for 3 hours to 6 hours.

7. The method according to claim 1, wherein the organic amine solution comprises an organic amine and a solvent, wherein the organic amine is one or more selected from the group consisting of polyethyleneimine, diethylenetriamine, tetraethylenepentamine, and pentaethylenehexamine, and the solvent is one or more selected from the group consisting of methanol, ethanol, acetone, and butyl acetate.

8. The method according to claim 7, wherein a mass ratio of the organic amine to the solvent in the organic amine solution is in a range of 1:10 to 1:100.

* * * * *